United States Patent
Woodward et al.

(10) Patent No.: US 11,218,872 B2
(45) Date of Patent: Jan. 4, 2022

(54) METHOD AND KEY MANAGEMENT FACILITY FOR MANAGING KEYS OF A SINGLE USER HAVING A PLURALITY OF MOBILE DEVICES

(71) Applicant: MOTOROLA SOLUTIONS, INC., Chicago, IL (US)

(72) Inventors: Timothy Woodward, Tempe, AZ (US); Chris A Kruegel, Plainfield, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 293 days.

(21) Appl. No.: 16/452,751

(22) Filed: Jun. 26, 2019

(65) Prior Publication Data
US 2020/0413254 A1 Dec. 31, 2020

(51) Int. Cl.
*H04K 1/00* (2006.01)
*H04W 12/04* (2021.01)
*H04L 9/08* (2006.01)

(52) U.S. Cl.
CPC ........... *H04W 12/04* (2013.01); *H04L 9/0891* (2013.01)

(58) Field of Classification Search
CPC .............................. H04W 12/04; H04L 9/0891
See application file for complete search history.

(56) References Cited

U.S. PATENT DOCUMENTS

| | | | |
|---|---|---|---|
| 8,948,396 B2* | 2/2015 | Kruegel | H04L 63/062 380/277 |
| 2010/0074446 A1* | 3/2010 | Fuchs | H04L 9/0833 380/278 |
| 2012/0140928 A1* | 6/2012 | Messerges | H04L 63/06 380/277 |
| 2018/0081671 A1* | 3/2018 | Naruse | G06F 16/2365 |

FOREIGN PATENT DOCUMENTS

| | | | | |
|---|---|---|---|---|
| EP | WO-0131837 A1 * | 7/2002 | ......... | H04L 9/0838 |
| WO | 2018127176 A1 | 6/2012 | | |

OTHER PUBLICATIONS

Harris Corporation: "LMR interworking key management summary", 3GPP, Draft; S3-180402 LMR Interworking Management Summary, 3rd Generation Partnership Project (3GPP), Mobile Competence Centre; 650, Route Des Key Lucio Les; F-06921 Sophia-Anti Polis Cedex ; France, vol. SA WG3, No. Gothenburg, Sweden; Jan. 22, 2018-Jan. 26, 2018, Jan. 23, 2018 (Jan. 23, 2018), XP051382680, Retrieved from the Internet:URL:http://www.3gpp.org/ftp/Meetings%5F3GPP%5FSYNC/SA3/Docs/, [retrieved on Nov. 10, 2021.

* cited by examiner

*Primary Examiner* — Phy Anh T Vu

(57) ABSTRACT

A method and Key Management Facility (KMF) for managing keys of a single user having a plurality of devices is provided. The KMF receives an Over-The-Air Rekeying (OTAR) message relating to a first device and including an interworking bit. If the interworking bit is set, the KMF (Continued)

retrieves a main source RSI and a Sub-RSI field from the OTAR message. If the main source RSI matches other main source RSIs from other devices, the KMF manages keys for all devices that have the same main source RSI in an identical manner.

20 Claims, 3 Drawing Sheets

METHOD AND KEY MANAGEMENT FACILITY FOR MANAGING KEYS OF A SINGLE USER HAVING A PLURALITY OF MOBILE DEVICES

BACKGROUND OF THE INVENTION

Key management in interworking communication systems is an important issue. In addition, encrypted interworking communications between a Land Mobile Radio (LMR) system and a Long-Term Evolution (LTE) system is also very important. Typically the key management processing is performed by a Key Management Facility (KMF). In encrypted interworking communication systems, the security keys must be managed and distributed to the appropriate communication systems and endpoints.

When an LTE user is using multiple interworking clients, each client must be provisioned with the same set of keys. The same key management state must also be maintained across each of the interworking clients, which can be extremely difficult using the existing LMR KMF key management architecture.

Therefore a need exists for a method and system for providing key management in interworking communication systems.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
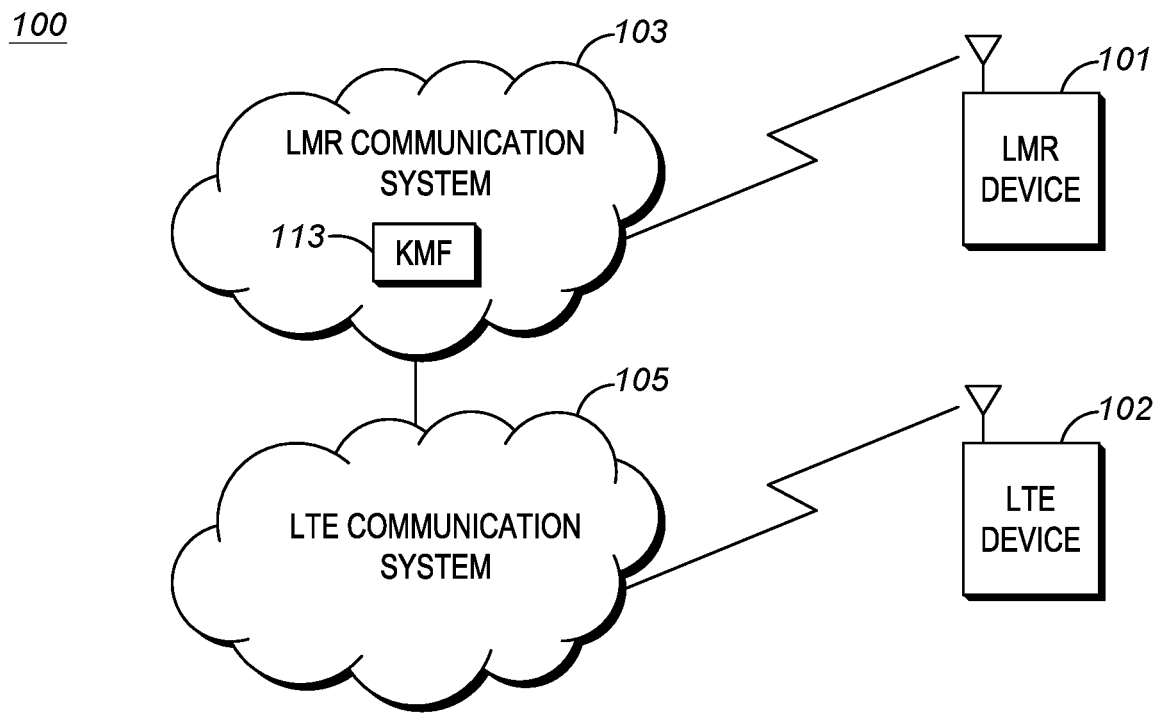
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment provides a method and KMF for managing keys of a single user having a plurality of mobile devices. An exemplary embodiment provides the ability of the KMF to maintain key management state and update keys for multiple mobile devices represented by a single common identifier. For example, in the case of LTE interworking, the single common identifier is the twenty most significant bits of the Source RSI (Radio Set Identifier). This exemplary embodiment thereby provides the ability for the KMF to manage a user and all devices of that user in LTE using the Over-The-Air Rekeying (OTAR) standard as defined. This allows for seamless use and no modifications to the procedures and management of the standard, since only an update of the identifier is needed. It should be understood that the concepts provided herein work in any 3GPP-compliant communication system.

FIG. 1 depicts a system diagram of a communication system 100 in accordance with an exemplary embodiment of the present invention. Communication system 100 preferably includes an LMR communication device 101, an LTE communication device 102, an LMR communication system 103, and an LTE communication system 105.

LMR communication device 101 is coupled with LMR communication system 103, and LTE communication device 102 is coupled with LTE communication system 105. LMR communication device 101 and LTE communication device are sometimes referred to as a subscriber units (SUs) or user equipment (UE). It should be understood that communication system 100 would typically include a plurality of communication devices, but only two are depicted in FIG. 1 for clarity.

LMR communication system 103 is a person-to-person voice communication system comprising two-way radio transceivers which can be mobile, installed in vehicles, or portable. LMR communication networks are widely used by public safety and first responder organizations such as police, fire, and ambulance services, and other governmental organizations. LMR communication system 103 can alternately be designed for private commercial use. Most LMR communication networks are half-duplex, with multiple mobile devices sharing a single radio channel, so only one mobile device can transmit at a time. The mobile device is normally in receiving mode so the user can hear other radios on the channel. When a user wants to talk, for example in a talkgroup call, the user presses a push to talk button on his mobile device, which turns on the transmitter of the mobile device. LMR communication system 103 preferably includes dispatch consoles, data applications, and RF conventional or trunked sites. LMR communication system 103 includes Key Management Facility (KMF) 113 and other various network elements that assist in facilitating communication, such as base stations and controllers, but only KMF 113 is shown in FIG. 1 for clarity purposes.

LTE communication system 105 is a cellular network that supports packet switching over an-IP network. LTE communication system 105 preferably includes System Architecture Evolution (SAE), which includes an Evolved Packet Core (EPC) network. Together LTE and SAE comprise the Evolved Packet System (EPS). LTE communication system 105 also preferably comprises an eNodeB (evolved node B), an MME (Mobile Management Entity), an HSS (Home Subscriber Server), an SGW (Serving GateWay), and a PGW (Packet data network GateWay).

Figure 2:
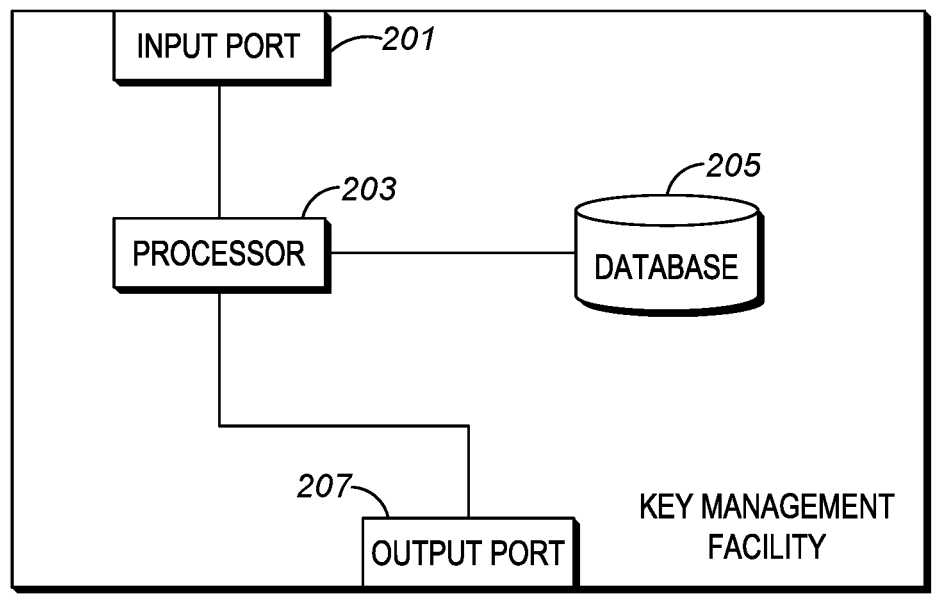
FIG. 2 depicts a Key Management Facility (KMF) in accordance with an exemplary embodiment of the present invention.

FIG. 2 schematically illustrates Key Management Facility (KMF) 113 in more detail. In the exemplary embodiment depicted in FIG. 2, KMF 113 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals from LMR Communication System 103. Input port 201 is electrically connected to processor 203. Output port 207 transmits signals to LMR Communication System 103. Output port 207 is electrically coupled to processor 203. Although depicted in FIG. 2 as two separate elements, input port 201 and output port 207 can be a single element.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium (not shown). The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the method of FIG. 4.

Figure 3:
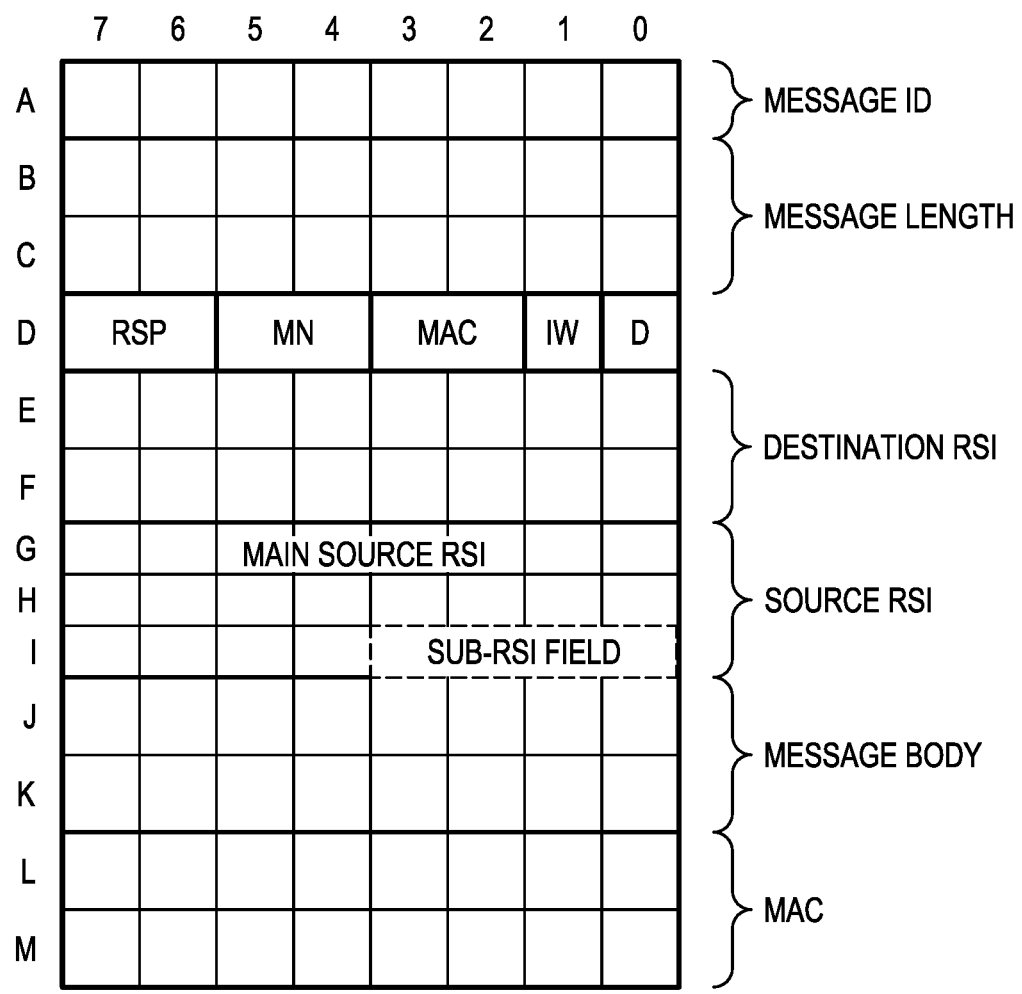
FIG. 3 depicts a key management message in accordance with an exemplary embodiment of the present invention.

FIG. 3 depicts a key management message (KMM) 300 in accordance with an exemplary embodiment of the present invention. In accordance with an exemplary embodiment, KMM 300 is an Over-The-Air Rekeying (OTAR) key management message with enhanced interworking Radio Set ID (RSI).

In accordance with an exemplary embodiment, message layout 300 includes a plurality of fields. In the exemplary embodiment depicted in FIG. 3, the columns represent bits, while the rows indicate bytes. Each bit can beset to "0" or "1", and a grouping of eight bits comprises one byte.

In accordance with an exemplary embodiment, row A includes the Message ID for the message. Rows B and C comprise the message length. Row D preferably comprises five fields. Bits 6 and 7 comprise the RSP field, which is the Response Kind field. The Response Kind field defines if the acknowledgment is to be returned to the sender of KMM 300. A binary value of 00 preferably defines a Response Kind 1 (None), a binary Value of 01 defines a Response Kind 2 (Delayed), a binary value of 10 defines Response Kind 3 (Immediate), and a binary value of 11 represents undefined.

Bits 4 and 5 comprise the MN field. The MN field represents the Message Number and defines the size of the Message Number field in KMM 300. A binary value of 00 preferably indicates that there is no message number, a binary value of 10 defines a 2 octet message number.

Bits 2 and 3 comprise the Message Authentication Code (MAC) field. The MAC field defines the authentication type used to validate the message. In accordance with an exemplary embodiment, a MAC field value of 00 indicates that there is no message authentication, a value of 01 is preferably reserved, a value of 10 indicates that the Enhanced algorithm-based Message Authentication Code is used to validate the message, and a value of 11 indicates that the DES algorithm based Message Authentication Code is used to validate the message.

Bit 1 comprises the Interworking Flag. Bit 0 comprises the D (Done) flag, which is preferably an optional bit that is used to indicate that the current KMM is the last in a series of KMMs. A value of "1" indicates NOT DONE, meaning that there are more to follow, and a value of "0" indicates that this is the last KMM, that this is the end of the sequence. The default value for this bit is preferably "0".

In accordance with an exemplary embodiment, the Interworking Flag can be set to "ON", preferably a 1, or "OFF", preferably a 0. When the Interworking Flag is set to ON, the KMF looks to the Sub-RSI Field, which is described in more detail below. When set to ON, the KMF will know to parse rows G,H,I as a Main Source RSI and a Sub-RSI as further described below. If the Interworking flag is set to OFF, the KMF will not look for a sub-RSI field.

Rows E and F comprise the destination RSI. The destination RSI can alternately comprise three rows and be twenty four bits. Rows G, H, and I comprise the Source RSI field. In an exemplary embodiment, when KMM 300 is received by KMF 113, the destination RSI will be the RSI of KMF 113, and the Source RSI field will include the ID of the sending LMR device or LTE device. When KMM 300 is received by a device, the destination RSI will be the ID of the device, while the Source RSI ID will be the ID of KMF 113. In accordance with an exemplary embodiment, when the receiving device is an LMR device, the Interworking bit is not set and the full RSI is applicable. In the exemplary embodiment where the receiving device is an LTE device, the Interworking bit is set to ON and the LMR device will parse the Source RSI into the Main Source RSI and the Sub-RSI Field. In accordance with an exemplary embodiment, when KMM 300 is received by an LTE device, the LTE device will determine that the Interworking bit is set and will parse the Main Source RSI and the Sub-RSI Field to make sure that the receiving device is the right device.

In accordance with an exemplary embodiment, when the Interworking Flag is set to ON, the Source RSI field is divided into two parts, the Main Source RSI field and the Sub-RSI Field. The Main Source RSI field preferably includes rows G and H as well as the first four bits, bits 4 through 7, of row I. The Sub-RSI field preferably includes the last four bits, bits 0 through 3, of row I. The Sub-RSI Field can thereby include sixteen unique values and is preferably provisioned into the LTE interworking client by the LTE key management system. Additional devices for the same user are also preferably provisioned with the same 20-bit Source RSI field but a different unique Sub-RSI Field. This provisioning can support up to sixteen unique interworking devices for a single user. In accordance with an exemplary embodiment, the spare bit ('S') in byte 4 of the OTAR header is designated as an "Interworking" indication ('IW'). The "Interworking" flag is set to ON by the LTE interworking client during OTAR registration and in any KMM the LTE interworking client sends to KMF 113.

Rows J and K comprise the Message Body. In accordance with an exemplary embodiment, the Message Body field varies in size depending on the key management message type and may contain content related to the key management message as indicated by the Message ID.

Rows L and M comprise the MAC. In accordance with an exemplary embodiment, the Message Authentication Code (MAC) field varies in size (e.g. 0 bytes, 7 bytes, 13 bytes, etc.) and may contain a message authentication code derived over the contents of the key management message.

Figure 4:
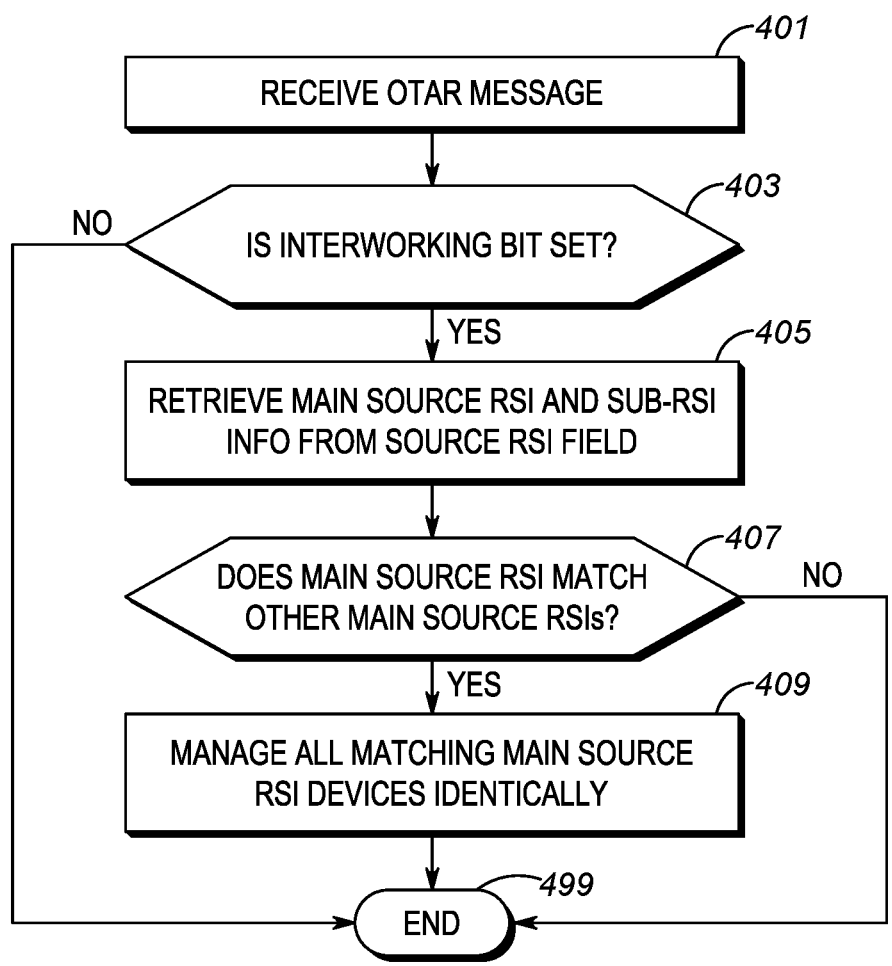
FIG. 4 depicts a flowchart in accordance with an exemplary embodiment of the present invention.

FIG. 4 depicts a flowchart 400 of a method for enabling a KMF to group LTE interworking clients with LMR interworking clients to share a single system identity. In accordance with an exemplary embodiment, a method is provided that allows KMF 113 to dynamically distinguish and group up to sixteen LTE and LMR interworking clients that share a single system identity, which can be linked with an LTE client ID such as an MCPTT ID or MCData ID.

KMF 113 receives (401) an OTAR message. The OTAR message is preferably in the format as depicted in FIG. 3.

KMF 113 determines (403) if the interworking bit is set in the OTAR message, preferably by checking the Interworking Flag in the OTAR message. If the Interworking bit is not set to ON, the process ends (499).

If interworking bit is set to ON as determined at step 403, KMF 113 retrieves (405) the Main Source RSI and Sub-RSI Field information from the Source RSI field. In accordance with an exemplary embodiment, KMF 113 interprets the Source RSI field in the OTAR message as having two parts, a Main Source RSI comprising the first twenty bits of the Source RSI field, and a Sub-RSI field comprising the last four bits of the Source RSI field. The Main Source RSI field represents the LTE interworking user and the Sub-RSI Field represents one of sixteen possible devices, or clients, associated with the interworking user. This effectively allows the reservation of sixteen devices for a single user.

KMF 113 determines (407) if the Main Source RSI field matches other main source RSI fields managed by KMF 113. If not, the process ends (499).

If the main source RSI field matches other main source RSI fields as determined at step 407, KMF 113 manages (409) all matching main source RSI mobile devices identically. As used herein, the phrase "manages . . . identically" means that KMF 113 is processing LTE devices in a functionally identical manner to LMR devices. For example, in LMR systems a user is typically functionally equivalent to a device. In LTE systems, a user may be associated with multiple devices. By utilizing an exemplary embodiment, KMF 113 does not require a change to the messaging protocol and can process LTE devices, even if multiple devices are assigned to a single LTE user.

In accordance with an exemplary embodiment, when any OTAR Registration message are received by KMF 113 where the Interworking bit is set and the Main Source RSI field are the same, KMF 113 provisions the same keys and maintains the same key management states for the matching devices. As an example, KMF 113 repeats the same OTAR message, except for any fields that relate to routing or the ID of the destination device, to all registered 'sub-RSI' addresses when sending OTAR messages to a particular LTE interworking user. In this exemplary embodiment, for each registered 'sub-RSI', KMF 113 populates the Destination RSI field of the OTAR key management message with the Main Source RSI value plus the Sub-RSI Field information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing keys of a single user having a plurality of devices, the method comprising:
   receiving an Over-The-Air Rekeying (OTAR) message at a Key Management Facility (KMF), the OTAR message including an interworking bit, a main source Radio Set Identifier (RSI) representing a single user, and a Sub-Radio Set Identifier (Sub-RSI) field representing a first device of a plurality of devices associated with the single user;
   determining, by the KMF, if the interworking bit included in the received OTAR message is set to "ON";
   retrieving, by the KMF, the main source RSI and the Sub-RSI field from the received OTAR message only if the interworking bit included in the received OTAR message is set to "ON";
   determining, by the KMF, if the main source RSI matches other main source RSIs from other devices;
   if the main source RSI matches other main source RSIs from other devices, determining, by the KMF, that the first device and the other devices are associated with the single user; and
   managing, by the KMF, keys for the first device and the other devices associated with the single user in an identical manner.

2. The method of claim 1, wherein the OTAR message includes a Source RSI Field, and wherein the Source RSI Field comprises the main source RSI and the Sub-RSI Field.

3. The method of claim 1, wherein the Sub-RSI field is linked with a Long-Term Evolution (LTE) client ID.

4. The method of claim 1, wherein the main source RSI represents a Long-Term Evolution (LTE) interworking user.

5. The method of claim 1, wherein the step of managing keys comprises provisioning identical keys for the first device and the other devices associated with the single user.

6. The method of claim 1, wherein the step of managing keys comprises maintaining identical key management states for the first device and the other devices associated with the single user.

7. The method of claim 1, wherein the step of managing keys comprises transmitting an identical OTAR message to the first device and the other devices associated with the single user.

8. A method for managing keys of a single user having a plurality of devices, the method comprising:
   receiving an Over-The-Air Rekeying (OTAR) message at a Key Management Facility (KMF), the OTAR message including an interworking bit, a main source Radio Set Identifier (RSI) representing a single user, and a Sub-Radio Set Identifier (Sub-RSI) field representing a first device of a plurality of devices associated with the single user;
   determining, by the KMF, if the interworking bit included in the received OTAR message is set;
   retrieving, by the KMF, the main source RSI and the Sub-RSI field from the received OTAR message only if the interworking bit included in the received OTAR message is set;
   determining, by the KMF, if the main source RSI matches other main source RSIs from other devices;
   if the main source RSI matches other main source RSIs from other devices, determining, by the KMF, that the first device and the other devices are associated with the single user; and
   synchronizing, by the KMF, keys for the first device and the other devices associated with the single user in an identical manner.

9. The method of claim 8, wherein the OTAR message includes a Source RSI Field, and wherein the Source RSI Field comprises the main source RSI and the Sub-RSI Field.

10. The method of claim 8, wherein the Sub-RSI field is linked with a Long-Term Evolution (LTE) client ID.

11. The method of claim 8, wherein the main source RSI represents a Long-Term Evolution (LTE) interworking user.

12. The method of claim 8, wherein the step of synchronizing keys comprises provisioning identical keys for the first device and the other devices associated with the single user.

13. The method of claim 8, wherein the step of synchronizing keys comprises transmitting an identical OTAR message to the first device and the other devices associated with the single user.

14. A Key Management Facility (KMF) for managing keys of a single user having a plurality of devices, the KMF comprising:
   an input port; and
   an electronic processor electrically connected to the input port, the electronic processor configured to:
      receive, via the input port, an Over-The-Air Rekeying (OTAR) message at a Key Management Facility (KMF), the OTAR message including an interworking bit, a main source Radio Set Identifier (RSI) representing a single user, and a Sub-Radio Set Identifier (Sub-RSI) field representing a first device of a plurality of devices associated with the single user;
      determining if the interworking bit included in the received OTAR message is set;
      retrieve the main source RSI and a Sub-RSI field from the received OTAR message only if the interworking bit included in the received OTAR message is set;
      determine if the main source RSI matches the main source RSIs from other devices;
      if the main source RSI matches other main source RSIs from other devices, determine that the first device and the other devices are associated with the single user; and
      manage keys for the first device and the other devices associated with the single user in an identical manner.

15. The KMF of claim 14, wherein the OTAR message includes a Source RSI Field, and wherein the Source RSI Field comprises the main source RSI and the Sub-RSI Field.

16. The KMF of claim 14, wherein the Sub-RSI field is linked with a Long-Term Evolution (LTE) client ID.

17. The KMF of claim 14, wherein the main source RSI represents a Long-Term Evolution (LTE) interworking user.

18. The KMF of claim 14, wherein the electronic processor is configured to provision identical keys for the first device and the other devices associated with the single user.

19. The KMF of claim 14, wherein the electronic processor is configured to maintain identical key management states for the first and the other devices associated with the single user.

20. The KMF of claim 14, further comprising an output port electrically connected to the electronic processor, wherein the electronic processor is configured to transmit, via the output port, an identical OTAR message to the first device and the other devices associated with the single user.

* * * * *